Jan. 26, 1960          F. PHILIPP          2,922,833
PRESSURE RESPONSIVE SAFETY DEVICE
Filed Aug. 2, 1956
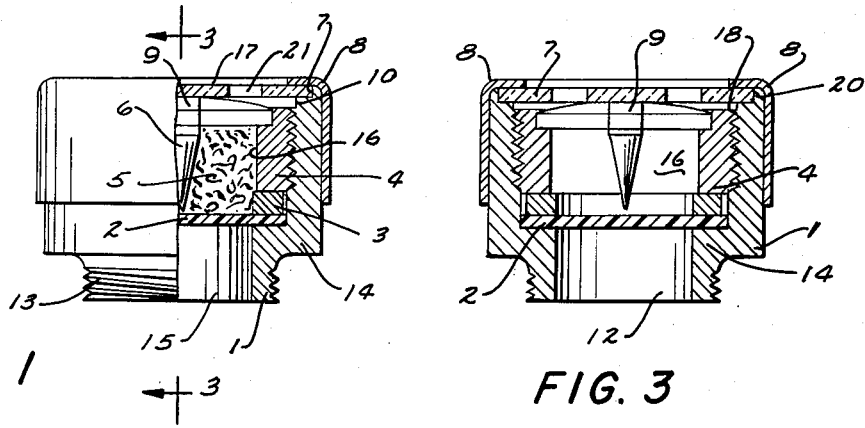
FIG. 1
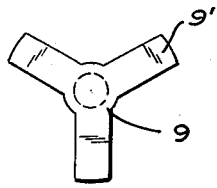
FIG. 2
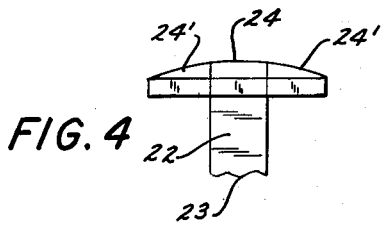
FIG. 4
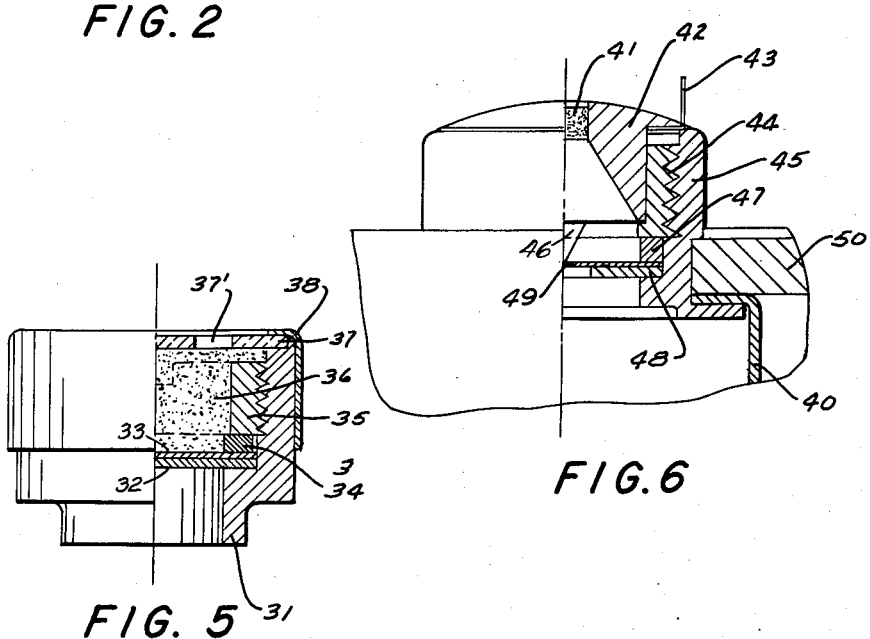
FIG. 5
FIG. 6
INVENTOR:
Fritz Philipp
BY: Michael S. Striker
    agt.

United States Patent Office 2,922,833
Patented Jan. 26, 1960

2,922,833
PRESSURE RESPONSIVE SAFETY DEVICE

Fritz Philipp, Hagen-Haspe, Germany, assignor to Firma Accumulatoren-Fabrik Aktiengesellschaft, Hagen, Westphalia, Germany Application August 2, 1956, Serial No. 601,734

Claims priority, application Germany August 4, 1955

5 Claims. (Cl. 136—177)

The present invention relates to a pressure responsive safety device, and more particularly it relates to a pressure responsive safety device for gas-tightly sealed batteries and galvanic elements.

The present application is a continuation-in-part of my co-pending applications Serial No. 569,184, entitled "Pressure Limiting Device," filed on March 2, 1956, and now abandoned, and Serial No. 570,034, entitled "Pressure Control Device," filed on March 7, 1956, now Patent No. 2,862,641.

Hermetically closed containers in which, due to gas formation or for other reasons, an increase in pressure may take place, frequently must be provided with a pressure responsive safety device which will be actuated by a predetermined degree of overpressure inside the container so as to release the interior overpressure when it reaches a predetermined value. In the absence of such pressure sensitive safety device, burating of the container, and as a consequence thereof, damage to the area surrounding the container may be caused by an excessive build-up of pressure inside the container.

Such pressure sensitive safety device is of special importance in connection with gas-tightly closed batteries or galvanic elements, since such batteries or elements, when improperly operated, may build up an interior overpressure capable of bursting the air-tight housings.

It is therefore an object of the present invention to provide a pressure responsive safety device.

It is another object of the present invention to provide a pressure responsive safety device which is especially suitable for use in connection with gas-tightly closed batteries and galvanic elements.

It is still another object of the present invention to provide a pressure responsive safety device which, upon visual inspection, will clearly indicate whether or not the same has been actuated.

It is yet another object of the present invention to provide a pressure control device which, when actuated by a predetermined degree of overpressure, will cause release of the same and also will reduce the sound effect connected with the release of overpressure.

It is a further object of the present invention to provide a pressure responsive safety device which may form part of a terminal of a battery.

Other objects and advantages of the present invention will become apparent from a further reading of the description and the appended claims.

With the above and other objects in view, the present invention mainly consists in a pressure sensitive safety device comprising, in combination, a hollow housing having a pair of opposite open ends communicating with the hollow interior thereof, a frangible membrane located in the housing between the ends thereof, extending across the interior thereof, and dividing the housing into a pair of chambers fluid-tightly sealed from each other by the membrane and respectively communicating with the open ends of the housing, so that when a predetermined pressure differential acts on the membrane, the latter will bulge from one of the chambers to a predetermined extent into the other of the chambers, and means carried by the housings for tearing the membrane when the predetermined pressure differential acts thereon, thus providing communication between the chambers.

According to a preferred embodiment, the present invention includes in a pressure responsive safety device, in combination, a hollow housing having a pair of opposite open ends communicating with the hollow interior thereof, a resilient membrane of predetermined thickness and resiliency located in the housing between the ends thereof, a frangible membrane having a thickness less than the predetermined thickness and a resiliency less than the predetermined resiliency superimposed upon the resilient membrane, the frangible membrane being formed of a material possessing a hardness greater than the hardness of the material of which the resilient membrane is formed, the superimposed resilient membrane and frangible membrane extending across the interior of the housing and dividing the housing into a pair of chambers fluid-tightly sealed from each other by the superimposed membranes and respectively communicating with the open ends of the housing, so that when a predetermined pressure differential acts on the superimposed membranes the same will bulge from one of the chambers into the other of the chambers, the thickness and resiliency of the membranes being so chosen that when a pressure differential greater than the predetermined pressure differential acts on the superimposed membranes the same will tear and provide communication between the chambers.

The present invention also contemplates in a pressure responsive safety device, in combination, a hollow housing having a pair of opposite open ends communicating with the hollow interior thereof, a frangible membrane located in the housing between the ends thereof, extending across the interior thereof, and dividing the housing into a pair of chambers fluid-tightly sealed from each other by the membrane and respectively communicating with the open ends of the housing, so that when a predetermined pressure differential acts on the membrane, the latter will bulge from one of the chambers to a predetermined extent into the other of the chambers, and piercing means carried by the housing and having a sharp piercing portion located in the other chamber next to the membrane for engaging and piercing the latter when the predetermined pressure differential acts on the membrane to tear the latter and provide communication between the chambers.

It is also within the scope of the present invention to provide in a battery arrangement, in combination, a battery housing being formed with at least one opening therein, a hollow terminal member mounted in the opening of the battery housing and having a pair of opposite open ends communicating with the hollow interior of the hollow member, the terminal member being conductively connected with a source of electric current inside the battery, a frangible membrane located in the hollow member between the ends thereof, extending across the interior thereof and dividing the hollow member into a pair of chambers fluid-tightly sealed from each other by the membrane and respectively communicating with the open ends of the hollow member, one of the chambers communicating with the interior of the battery housing, and the hollow member with the membrane therein also fluid-tightly closing the opening of the battery housing, so that when a predetermined overpressure from the interior of the battery housing acts on the membrane, the latter will bulge from the one chamber communicating with the interior of the battery housing to a predetermined extent into the other of the chambers, and means carried by the hollow member for tearing the membrane when the predetermined pressure differential acts thereon, thus providing communication between the interior of the battery housing and the other of the chambers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view, partly in cross section, of a pressure limiting device according to the present invention;

Fig. 2 is a top plan view of the piercing means shown in Fig. 1;

Fig. 3 is a sectional view taken along line III—III of Fig. 1 in the direction of the arrows;

Fig. 4 is an elevational view of a different embodiment of the piercing means according to the present invention;

Fig. 5 is an elevational view, partly in cross section of a pressure control device according to another embodiment of the present invention; and Fig. 6 is an elevational view, partly in cross section of still another embodiment of a pressure control device according to the present invention.

Referring now to the drawings and particularly to Fig. 1, a hollow housing 1 is shown partly in cross section. Housing 1 is adapted to communicate at end portion 12 with the interior of a container such as for instance a battery. Housing 1 may be attached to a container by means of screw threads 13 or by any other suitable means. It is, however, also within the scope of the present invention to form housing 1 as an integral part of the container or battery. Membrane 2 is fixed to housing 1 by means of slip ring 3 and annular screw plug 4 which hold membrane 2 against shoulder 14 forming part of the interior wall of housing 1. Membrane 2 extends across the interior of housing 1 and divides the same into two chambers, chamber 15 which includes end portion 12 and is adapted to communicate with the interior of a container in which pressure may be built up, and chamber 16 located on the other side of membrane 2 which communicates at end portion 17 with the outer atmosphere.

In the embodiment illustrated in Figs. 1, 2 and 3, the piercing means comprise a needle 6 extending through a chamber 16 in the direction towards membrane 2, and ribs 9' extending horizontally from needle head 9 located at the end of needle 6 which is farther distant from membrane 2. Ribs 9' rest on shoulder 18 of annular screw plug 4. A transparent plate 7 extends across the free end portion 20 of hollow housing 1. Plate 7 is formed with at least one perforation 21. Plate 7 may be either completely transparent or may be transparent in parts only. Annular cap 8 is superimposed over portions of plate 7 and of the outer side walls of housing 1 in order to prevent outward movement of plate 7. The center portion of plate 7 is in contact with the head 9 of needle 6 and prevents movement of needle 6 away from membrane 2. Needle 6 may be unitary with or welded or soldered to head 9.

Upon increase of pressure in the container communicating with chamber 15, membrane 2 will bulge into chamber 16 and there press against the sharp piercing end of needle 6. Membrane 2 is made of such material and is of such thickness that when the pressure in chamber 15 reaches a predetermined value, membrane 2 will press against the piercing portion of the piercing means with such force that the piercing means will tear membrane 2. Thereby an opening between chamber 15 and chamber 16 will be formed through which the pressure causing fluid will pass into chamber 16 and from chamber 16 through holes 21 in plate 7 to the outer atmosphere.

An air-tightly closed battery usually contains an alkaline liquid such as an aqueous solution of potassium hydroxide. When in such air-tight battery provided with the pressure limiting safety device of the present invention, pressure is built-up due to formation of gas, and such pressure reaches the value at which membrane 2 is pressed against the piercing means with sufficient force to cause tearing of membrane 2, gas will escape from the battery through hollow container 1 to the outer atmosphere. The escaping gas will carry along portions of the alkaline liquid contained in the battery. Frequently, considerable noise is created by the escaping gas. In order to reduce the noise accompanying actuating of the safety device of the present invention, sound absorbing means 5 loosely fill the free space in chamber 16. Sound absorbing means 5 preferably consist of a haphazardly arranged fibrous material such as a cotton wad, asbestos wad or the like. Holes 21 in plate 7 are sufficiently small so as not to allow the sound absorbing material 5 to be pushed out of chamber 16 by the escaping gas.

According to a preferred embodiment of the present invention, the sound absorbing means 5 are impregnated with or otherwise contain an indicator substance which is adapted to change its color upon coming in contact with the liquid carried by the escaping gas into chamber 16. The indicator substance is so chosen as to suffer a marked change in color when coming in contact with the specific liquid which may be carried along with the escaping gas. For instance, in the case of a gas-tightly sealed battery containing an aqueous solution of potassium hydroxide, the sound absorbing means may consist of a fibrous cotton web which has been impregnated with a solution of litmus or phenolphthalein.

Membrane 2 has to be of such material and of such thickness that it will bulge sufficiently under the predetermined pressure at which the safety device of the present invention is to be actuated, to press against the piercing means with such force as to cause tearing of membrane 2. Membrane 2 is preferably also made of such material that it will not be chemically affected by the fluid contained in the container communicating with chamber 15. A great variety of materials can therefore be used for membrane 2, depending on the actual operating conditions. These materials include metal foils, parchments, sheets and plates of natural and synthetic plastic materials of the desired resiliency, and the like. The resiliency of membrane 2 should be such that the same will bulge to the desired degree when exposed to pressure, however, the material of membrane 2 should also be of sufficient brittleness that upon tearing of the membrane by the piercing means an opening between chambers 15 and 16 will be formed, i.e. torn membrane 2 should not resiliently adhere to the piercing portion of the piercing means.

As illustrated in Fig. 4, the piercing means may also comprise a plate 22 terminating in a sharp piercing end 23 which in the embodiment illustrated in Fig. 4 is of ragged toothed shape. The present invention, however, is not limited to any specific configuration of the piercing portion of the piercing means which for instance may also have the (non-illustrated) shape of a curved knife blade. From the head portion 24 of plate 22 ribs 24' extend somewhat similarly to ribs 9' illustrated in Fig. 2, to shoulder 18 of annular screw plug 4. Ribs 24' resting on shoulder 18 maintain the piercing plate at the desired short distance from membrane 2 when the same is in plane position. Plate 7 limits outward movement of head portion 24 of plate 22.

While plate 7 has been described in accordance with a preferred embodiment of the present invention as a perforated at least partially transparent plate, the present invention is not limited to the use of a transparent plate 7. One of the functions of plate 7 is to prevent outward movement of the piercing means. Furthermore, in the illustrated preferred embodiment of the present invention, plate 7 is provided with holes or perforations 21 through which fluid under pressure may escape into the outer atmosphere. When it is desired to determine by quick visual inspection whether the pressure limiting device of the present invention has been actuated, it is preferred to have plate 7 at least partially transparent so that the change of color of an indicator substance contained in the sound absorbing means 5 located in chamber 16 may be quickly observed.

Referring now to Fig. 5, a hollow housing 31 is shown partly in cross section. Housing 31 is adapted to communicate at one end portion with the interior of a container such as for instance a fluid-tightly sealed battery. A resilient soft membrane 32 and a frangible harder and thinner membrane 33, superimposed upon membrane 32 are jointly fixed to housing 31 by means of slip ring 34 and annular screw plug 35. Membranes 32 and 33 extend across the interior of housing 31 and divide the same into two chambers one of which is adapted to communicate with the interior of a container in which pressure may be built up, and one of which located on the other side of membranes 32 and 33 communicates with the outer atmosphere. A preferably transparent plate 37 extends across the free end portion of the chamber communicating with the outer atmosphere. Plate 37 is formed with at least one perforation 37' through which communication between the adjacent chamber and the outer atmosphere is maintained. Annular cap 38 is superimposed over peripheral portions of plate 37 and portions of the outer side walls of housing 31 in order to prevent outward movement of plate 37.

Upon increase of pressure in the container communicating with one of the chambers, the resilient, relatively soft membrane 32 facing into said chamber and airtightly sealing the same against the other chamber, will bulge into the other chamber and thereby will also cause bulging of the frangible, harder and thinner membrane 33 which is superimposed upon membrane 32 and faces into the other chamber which communicates with the outer atmosphere. When the pressure in the container is increased above a predetermined degree, superimposed membranes 32 and 33 will be torn and the over pressure in the container will be relieved by the flow of fluid from the container through the two chambers of the hollow housing into the outer atmosphere.

Bulging of membrane 32 which for instance may be formed of soft rubber, is first limited by superimposed membrane 33 which may be formed of a suitable synthetic plastic material or the like. However when the over pressure acting on membrane 32 exceeds a predetermined degree, membrane 33 can no longer withstand the bulging pressure of membrane 32 and simultaneous bursting or tearing of both membranes 32 and 33 occurs.

According to a preferred embodiment of the present invention either membrane 32 or membrane 33 is formed with a small bore or a slit therethrough in which case the degree of pressure which will cause bursting of the two membranes is controlled not only by the thickness and resiliency of each of the two membranes but also by the bore or slit in one of them.

An air-tightly closed battery usually contains an alkaline liquid such as an aqueous solution of potassium hydroxide. When in such air-tight battery provided with the pressure control device of the present invention, pressure is built-up due to the formation of gas, and such pressure reaches the volume at which membranes 32 and 33 are torn, gas will escape from the battery through the hollow housing 31 to the outer atmosphere. The escaping gas will carry along portions of the alkaline liquid from the battery. Frequently, considerable noise is created by the escaping gas. In order to reduce the noise accompanying actuating of the pressure control device of the present invention, sound absorbing means 36 are provided, according to a preferred embodiment of the present invention, which loosely fill the chamber in hollow housing 31 which communicates with the outer atmosphere. Sound absorbing means 36 preferably consist of a haphazardly arranged fibrous material such as a cotton wad, asbestos wad or the like. Perforations in plate 37 are sufficiently small so as not to allow the sound absorbing material 36 to be pushed out of the hollow housing by the escaping gas.

According to another preferred embodiment of the present invention, the sound absorbing means 36 are impregnated with an indicator substance adapted to change its color upon coming in contact with the escaping fluid. In the case of gas-tightly sealed alkaline batteries, the sound absorbing means may for instance be impregnated with litmus or phenolphthalein as indicator substance.

As stated further above, it is also within the scope of the present invention to combine the pressure responsive safety device with an electric terminal of a battery. Such an embodiment is illustrated in Fig. 6, which shows a portion of a battery housing 50 terminating at an opening therein and a hollow partially threaded member 45 mounted in the opening of the battery housing. Terminal member 45 is electrically conductive and is connected with one side of the plates in the battery by conductor 40, while conductor 43 connects terminal member 45 with electric conduits leading from the battery to a current consuming or current supplying installation. An annular screw plug 44 threadedly interconnects member 45 and contact plug 42. Conductor 43 is conductively connected with both contact plug 42 and member 45. Contact plug 42 is formed with an opening which may be filled with absorbent cotton 41 or the like which has been treated with an indicator so that the presence of battery fluid will become apparent by a color change of the indicator-treated absorbent cotton 41. Annular screw plug 44 is screwed down on slip ring 47 which presses membrane 49 and annular packing ring 48 onto a shoulder of member 45. The center opening in annular packing ring 48 is thus closed by superimposed membrane 49. Piercing needle 46 points downwardly towards membrane 49 and is held in place about its circumference by being clamped between contact plug 42 and a shoulder in the lower portion of annular screw plug 44. When overpressure is built up in the battery, membrane 49 will bulge upwardly towards the point of piercing needle 46, and when the pressure reaches a predetermined degree, the bulging membrane 49 will press so strongly against the point of piercing needle 46 that piercing needle 46 will tear membrane 49 thereby allowing the overpressure to escape through the absorbent material 41 into the outer atmosphere.

It is an advantage of the last described embodiment which is of special importance in connection with relatively small gas-tight batteries, that additional space need not be provided for the pressure responsive safety device since the same is located within the space occupied by the battery terminal. However, the advantage of the present embodiment is not limited to small batteries since, regardless of the size of the batteries, the number of structural members is reduced by combining the safety device of the present invention with the terminal of the battery, and thus costs are reduced.

Fig. 6 shows the pressure responsive safety device centrally located within the battery terminal by way of example only. The present invention, and more particularly the embodiment illustrated in Fig. 6, is not limited to any specific position of the safety device within the terminal of the battery.

As can be seen from Fig. 6, the opening in hollow partially threaded member 45, prior to assembly of contact plug 42, piercing needle 46, membrane 49 and packing ring 48 forms a channel through which communication is established between the interior of the battery housing and the outer atmosphere. If desired, this channel may be used for introducing the electrolyte into the battery. It is, of course, also possible to introduce the electrolyte into the battery through the opening in battery housing 50 prior to assembling any parts of the battery terminal and the pressure responsive safety device.

It will be understood that each of the elements described above, or two or more together, may also find a useful application in other types of pressure responsive safety device differing from the types described above.

While the invention has been illustrated and described as embodied in pressure responsive safety device for gas-tightly sealed batteries, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristic of the generic or specific aspects of this invention and, therefore, such adaptations should and are intended to be comprehended within the meaning and range of equivalence of the following claims.

What is claimed as new and desired to be secured by Letters Patent is:

1. A gas-tightly sealed battery, comprising, in combination, a battery housing formed with at least one opening therein; a hollow member mounted in said opening of said battery housing and having a pair of opposite open ends communicating with the hollow interior of said hollow member; a fluid-impermeable continuous frangible membrane located in said hollow member between said ends thereof, extending across the interior thereof, and dividing said hollow member into a pair of chambers fluid-tightly sealed from each other by said membrane and respectively communicating with said open ends of said hollow member, one of said chambers communicating with the interior of said battery housing and said hollow member with said membrane therein also fluid-tightly closing said opening of said battery housing, said membrane being adapted when subjected to a superatmospheric operating pressure of said battery to bulge from said one chamber communicating with the interior of said battery housing a first distance into said other chamber, and when subjected to an over-pressure being greater than said operating pressure to bulge a second distance being greater than said first distance into said other chamber; and piercing means carried by said hollow member and having a sharp piercing portion located in said other chamber spaced from said membrane at said second distance for tearing said membrane when the same bulges said second distance due to being subjected to said greater over-pressure whereby destruction of said battery due to build-up of pressure in excess of said operating pressure is prevented.

2. A gas-tightly sealed battery, comprising, in combination, a battery housing being formed with at least one opening therein; a hollow member mounted in said opening of said battery housing and having a pair of opposite open ends communicating with the hollow interior of said hollow member; a fluid-impermeable continuous frangible membrane located in said hollow member between said ends thereof, extending across the interior thereof and dividing said hollow member into a pair of chambers fluid-tightly sealed from each other by said membrane and respectively communicating with said open ends of said hollow member, one of said chambers communicating with the interior of said battery housing and said hollow member with said membrane therein also fluid-tightly closing said opening of said battery housing, said membrane being adapted when subjected to a superatmospheric operating pressure of said battery to bulge from said one chamber communicating with the interior of said battery housing a first distance into said other chamber, and when subjected to an over pressure being greater than said operating pressure to bulge a second distance being greater than said first distance into said other chamber; and piercing means carried by said hollow member and having a plate terminating in a sharp piercing end extending into said other chamber spaced from said membrane at said second distance, for tearing said membrane when the same bulges said second distance due to being subjected to said greater over-pressure, whereby destruction of said battery due to build-up of pressure in excess of said operating pressure is prevented.

3. A gas-tightly sealed alkaline battery, comprising, in combination, a battery housing formed with at least one opening therein; a hollow member mounted in said opening of said battery housing and having a pair of opposite open ends communicating with the hollow interior of said hollow member; a fluid-impermeable continuous frangible membrane located in said hollow member between said ends thereof extending across the interior thereof and dividing said hollow member into a pair of chambers fluid-tightly sealed from each other by said membrane and respectively communicating with said open ends of said hollow member, one of said chambers communicating with the interior of said battery housing and said hollow member with said membrane therein also fluid-tightly closing said opening of said battery housing, said membrane being adapted when subjected to a superatmospheric operating pressure of said battery to bulge from said one chamber communicating with the interior of said battery housing a first distance into said other chamber, and when subjected to an over-pressure being greater than said operating pressure to bulge a second distance being greater than said first distance into said other chamber; piercing means for tearing said membrane carried by said hollow member and having a sharp piercing portion located in said other chamber spaced from said membrane at said second distance for tearing said membrane when the same bulges said second distance due to being subjected to said greater over-pressure, whereby destruction of said battery due to build-up of pressure in excess of said operating pressure is prevented; and absorbent means comprising a haphazardly arranged fibrous material located in said other chamber said fibrous material containing an indicator substance adapted to change its color upon contact with portions of alkaline liquid being driven from the interior of said battery into said other chamber upon tearing of said membrane.

4. A gas-tightly sealed battery, comprising, in combination, a battery housing formed with at least one opening therein; a hollow member mounted in said opening of said battery housing and having a pair of opposite open ends communicating with the hollow interior of said hollow member; a fluid-impermeable continuous frangible membrane located in said hollow member between said ends thereof, extending across the interior thereof and dividing said hollow member into a pair of chambers fluid-tightly sealed from each other by said membrane and respectively communicating with said open ends of said hollow member, one of said chambers communicating with the interior of said battery housing, and said hollow member with said membrane therein also fluid-tightly closing said opening of said battery housing, said membrane being adapted when subjected to a superatmospheric operating pressure of said battery to bulge from said one chamber communicating with the interior of said battery housing a first distance into said other chamber, and when subjected to an over-pressure being greater than said operating pressure to bulge a second distance being greater than said first distance into said other chamber; and piercing means carried by said hollow member and located in said other chamber spaced from said membrane at said second distance, for tearing said membrane when the same bulges said second distance due to being subjected to said greater over-pressure, whereby destruction of said battery due to build-up of pressure in excess of said operating pressure is prevented.

5. A gas-tightly sealed battery comprising, in combination, a battery housing being formed with at least one opening therein; a hollow terminal member mounted in said opening of said battery housing and having a pair of opposite open ends communicating with the hollow interior of said hollow terminal member, said terminal member being conductively connected with a source of electric current inside said battery; a fluid-impermeable continuous frangible membrane located in said hollow terminal member between said ends thereof, extending across the interior thereof and dividing said hollow member into a pair of chambers fluid-tightly sealed from each other by said membrane and respectively communicating with said open ends of said hollow terminal member, one of said chambers communicating also with the interior of said battery housing, and said hollow member with said membrane therein also fluid-tightly closing said opening of said battery housing, said membrane being adapted when subjected to a superatmospheric operating pressure of said battery to bulge from said one chamber communicating with the interior of said battery housing a first distance into said other chamber, and when subjected to an over-pressure being greater than said operating pressure to bulge a second distance being greater than said first distance into said other chamber; and piercing means carried by said hollow member having a sharp piercing portion located in said other chamber spaced from said membrane at said second distance, for tearing said membrane when the same bulges said second distance due to being subjected to said greater over-pressure, whereby destruction of said battery due to build-up of pressure in excess of said operating pressure is prevented.

References Cited in the file of this patent

UNITED STATES PATENTS

| | | |
|---|---|---|
| 1,867,249 | Clark et al. | July 12, 1932 |
| 2,048,417 | Van Embden | July 21, 1936 |
| 2,240,836 | Cotton | May 6, 1941 |
| 2,516,084 | Wells | July 18, 1950 |

FOREIGN PATENTS

| | | |
|---|---|---|
| 528,077 | Great Britain | Oct. 22, 1940 |
| 706,854 | France | Apr. 4, 1931 |